350-96.24
E197A          XR   3,633,031    SR     TX350-96.24

United States Patent

[11] 3,633,031

| [72] | Inventors | Carl A. Pesce<br>Oak Lawn;<br>Sheldon Osheff, Chicago, both of Ill. |
|---|---|---|
| [21] | Appl. No. | 1,676 |
| [22] | Filed | Jan. 9, 1970 |
| [45] | Patented | Jan. 4, 1972 |
| [73] | Assignee | Continental Can Company Inc.<br>New York, N.Y. |

[54] CAN WELD SIDE-SEAM DEFECT DETECTOR UTILIZING INFRARED DETECTION MEANS AND COLLIMATOR FIBER OPTICS
17 Claims, 10 Drawing Figs.

[52] U.S. Cl. ..................................... 250/83.3 H,
     250/83.3 D, 250/105, 250/227
[51] Int. Cl. .................................... G01j 5/00
[50] Field of Search ............................ 250/83.3 D,
     83.3 H, 71.5 S, 105, 227

[56] References Cited
UNITED STATES PATENTS

| 3,020,745 | 2/1962 | Sielicki | 250/83.3 H X |
| 3,106,642 | 10/1963 | Shapiro | 250/83.3 H X |
| 3,163,758 | 12/1964 | Treacy | 250/83.3 H |
| 3,191,441 | 6/1965 | Erickson | 250/83.3 H X |
| 3,244,894 | 4/1966 | Steele et al. | 250/83.3 H X |
| 3,408,497 | 10/1968 | Lowe | 250/83.3 H |
| 3,509,341 | 4/1970 | Hindel et al. | 250/71.5 S |

*Primary Examiner*—Archie R. Borchelt
*Attorneys*—Americus Mitchell, Joseph E. Kerwin and William A. Dittmann

ABSTRACT: In order to detect can weld side-seam flaws or defects an infrared sensitive detector head is used. A collimator fiber optics or an optical mask are used to give a higher resolution. Optical fibers may have a second coating of EMA or an occasional optically absorbent fiber may be placed parallel to the optic fibers in order to cut down crosstalk and introduce an absorbent medium between the fibers. Coherent fiber optics may be used.

Fig 3 - Absorbing fibers in bundle

PATENTED JAN 4 1972

INVENTORS
CARL A. PESCE
SHELDON OSHEFF

BY
ATT'Y.

CAN WELD SIDE-SEAM DEFECT DETECTOR UTILIZING INFRARED DETECTION MEANS AND COLLIMATOR FIBER OPTICS

Our invention relates to an instrument for detecting one or more defects in a welded seam. Particularly our invention relates to detecting one or more defects in a welded can side-seam. Also our invention relates to detecting defects in a can side-seam through the use of infrared sensitive elements for sensing the intensity of infrared emanations from a can side-seam.

In the past, defective cans have been detected by tests. A defective can have a leak allows interior pressure to escape and by this escape a defective can may be determined. Can seam defects are also located visually with a manual rejection.

It is an object of the present invention to provide a can side-seam infrared detector for this purpose of detecting spots poorly welded in a welded seam.

Another object of the present invention is to provide a defect weld detector for locating a defective weld section.

It is a further object of the present invention to provide an infrared detector unit to detect variations of defects in sheet material of any sort.

In brief, our invention is an infrared detector unit having a collimator or bundles of fiber optics for bringing about a high optical resolution in the detector unit. Behind the collimator or fiber optic bundle are a series of photoelectric cells made of material, for example, lead sulfide. As the can seam passes across this area the photoelectric cells are connected in a circuit to develop electrical variation in response to variations in the intensity of the infrared radiation given off by different parts of the can seam. The electrical output from the photoelectric cell is conducted to another part of the apparatus where appropriate reject action takes place to reject cans having defective side-seams. The detector unit is cooled by water and pressurized air.

Other objects and advantages of this invention will become apparent to those skilled in the art from the following detailed description, taken in conjunction with the attached sheets of drawings on which are shown several embodiments of this invention.

Figure 3:
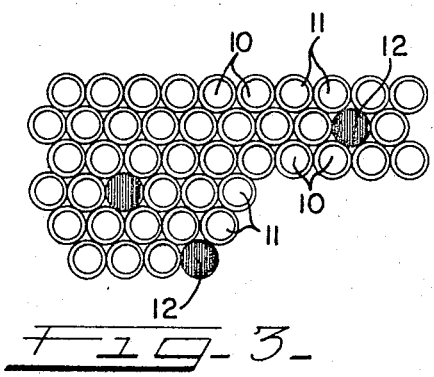
FIG. 3 shows an exposed optic fiber.
Figure 4:
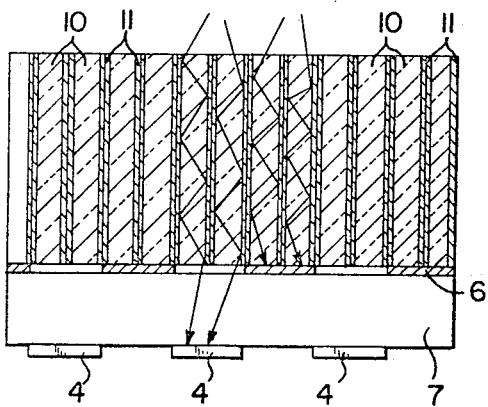

FIG. 4 3 shows an optical mask in side view.

Figure 5:
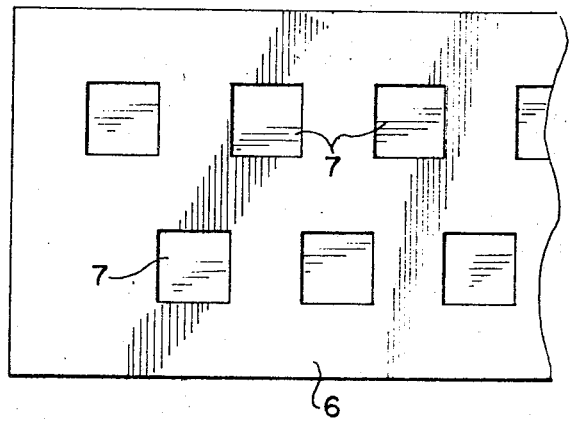

FIG. 5 shows an optical mask with staggered radiation apertures.

Figure 6:
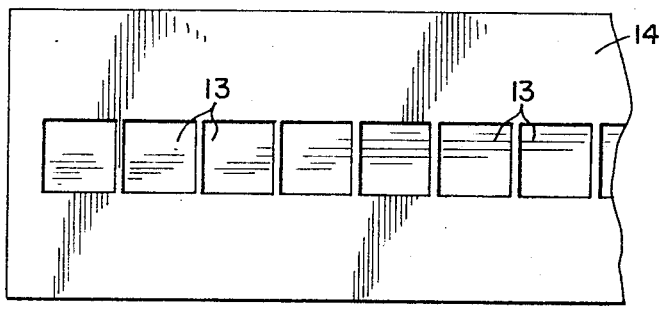

FIG. 6 shows an optical mask with radiation apertures in a straight line.

Figure 7:
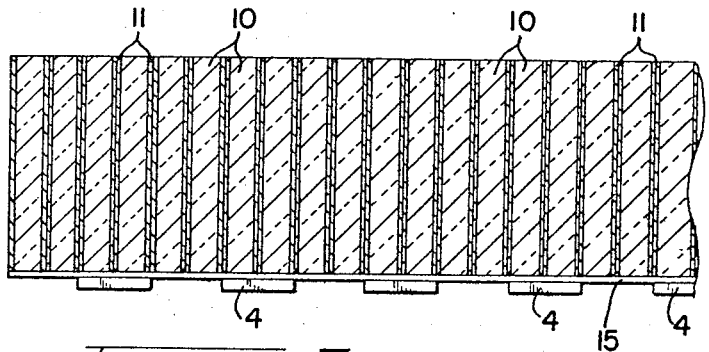

FIG. 7 shows a detector unit using a neutral density filter.

Figure 8:
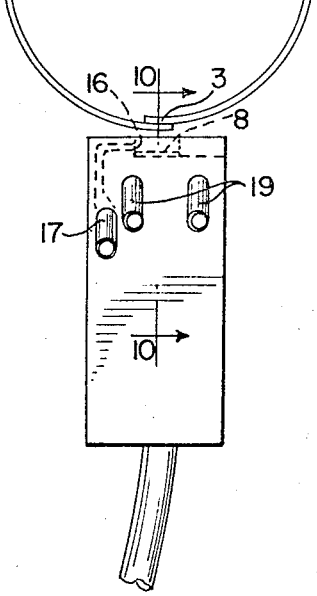

FIG. 8 shows the unit in place with air and water leads.

Figure 9:
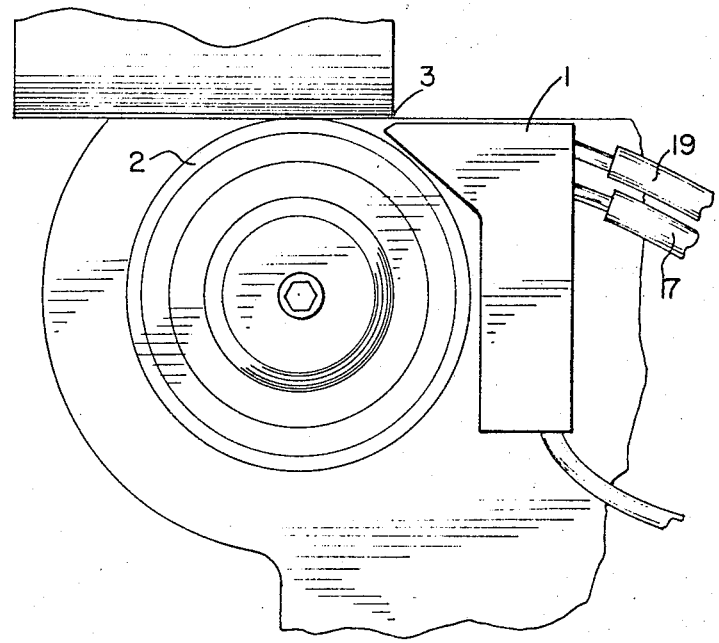

FIG. 9 shows the detector unit air lead and passages.

Figure 10:
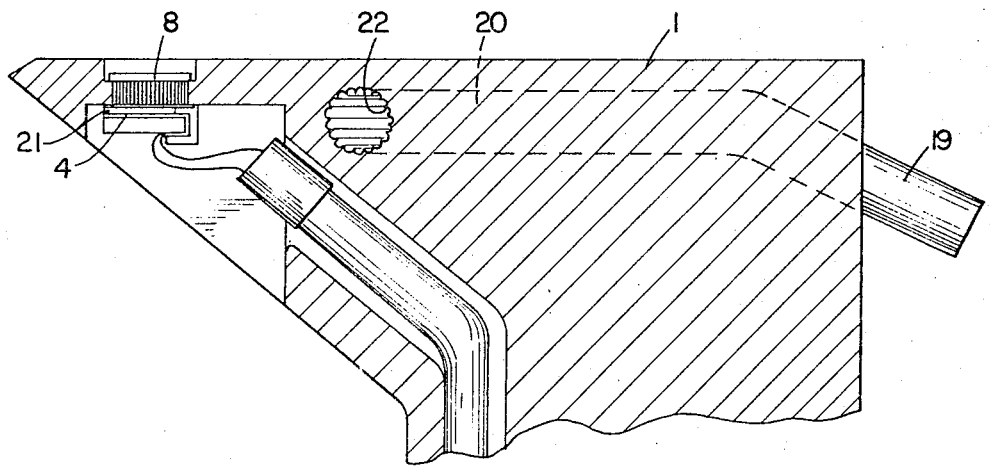

FIG. 10 shows the detector unit with water leads and water passages.

Figure 1:
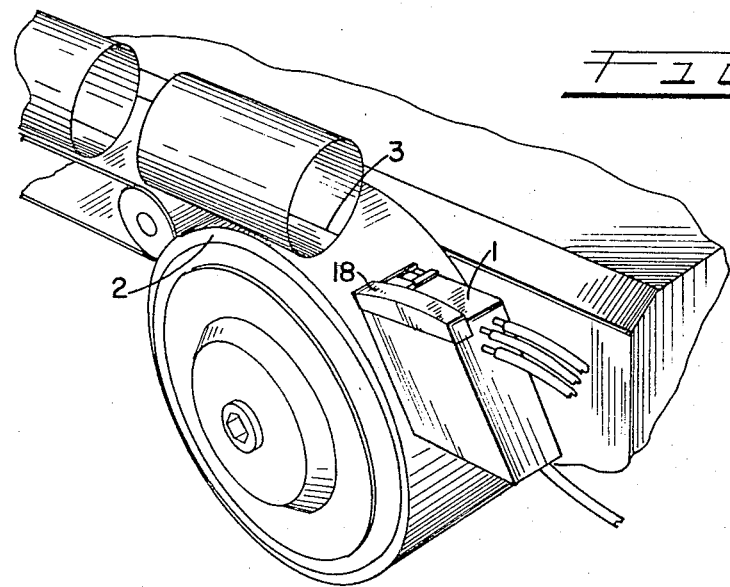
FIG. 1 shows a perspective view of a detector unit in a can welding line.

This detector unit is intended for the principal purpose of detecting defects in can side-seams. However, it has the capability to be used for defect detection in welds or for defect detection in sheet material The illustration of FIG. 1 shows a can side-seam conveyed across the detector unit 1, as shown this can side-seam is traveling generally across the plane of the paper. Detector unit 1 is located as close as possible in this line of travel to the point where the can side-seam is welded. The detector unit is located as close as possible to the welding station 2 because the outline of each weld defect is preserved for only a brief period of time.

The process by which this happens is that when the can is welded together any defect in the weld 3 shows up as a high or low heat area on the can side-seam. This means that infrared energy is given out from this particular part of the weld at a high or low level depending on the temperature at that area. As the can travels away from the welding point, heat is transferred by conduction laterally throughout the can. Since the can side-seam is very hot, heat travels rapidly throughout the can side-seam. Thus, within a few moments of the time of the weld, the temperature of the can side-seam is equalized throughout the side-seam and thus infrared energy at an equal level is radiated throughout the entire side-seam. However, for a few moments of time after the side-seam leaves the weld point the temperature of each defect is clearly outlined. That is to say, the area of each defect does not give off infrared radiation with anything like the same intensity that the properly welded areas of the can radiate infrared energy. The properly welded areas are heated to a certain range of temperature and thus give off infrared radiation of a certain intensity of infrared radiation which falls within certain range of intensity. In the case where the can side-seam has not welded and this area has not been heated to the same temperature as the surrounding welded areas then this area does not radiate infrared energy to the extent that the surrounding fully welded area radiates infrared energy. For this reason, an optical or infrared scanner is able to detect an area which is not welded. Conversely, the area where a burn-through has been made in the side-seam is unusually hot or at a very high temperature and radiates greater amounts of infrared radiation than a normal good welded area. This excess of radiation may also be detected by our detector unit and used to generate a signal which is interpreted to indicate a defective can seam. An electronic circuit for utilizing the signal generated is found in the patent titled "Electronic Can Reject System" by Sheldon Osheff and Carl A. Pesce, U.S. Pat. No. 3,586,168, issued June 22, 1971 and assigned to the assignee of the present invention.

Specifically, our detector has a set of fiber optics having their axis at one end pointing in the direction of a can seam. As shown in FIG. 1, a can being welded is turned so that the can seam 3 is located at the lower end of the can and thus the axes of the collimator or fiber optics are pointing in an upward direction to receive radiation from the can seam. The fiber optics are composed of a bundle of elongated fibers which transmit electromagnetic radiation such as infrared radiation along the longitudinal axis of the fibers. The infrared radiation enters the fibers at the fiber end closest to the can seam and makes its exit in a direction so as to fall onto the detector units. There are 12 detector cells (FIG. 2) of approximately 0.010 inch square each and the total of these 12 detector cells 4 cover a width of about 0.120 inch. The width of most can laps is 0.040 inch. Seemingly a unit detector covering only 0.040 inch width would suffice. However, can blanks have variations from blank to blank. This variation in size of can blanks produces a seam having a variety of widths and also may effect the position of the can seam as opposed to the detector unit. In any case, it has been found that for a can overlap of about 0.040 inch a detector width of about three times the can overlap width is sufficient to inspect all of the can seams. When a defective part of a can seam passes over the detector unit, the detector unit generates a signal which is greater or lesser than a predetermined normal range of signal strength.

The infrared radiation from the can seam passes through the collimator or fiber optic bundle and from there to the photoelectric elements. A fiber optic bundle is not restricted to short lengths but may be made of considerable length so that the detector is not necessarily in the proximity of the can seam. This gives a greater degree of latitude to the location of the photoelectric cells than would otherwise be the case. Ordinarily, there is one photoelectric element 4 for bundles of the 12 locations comprising the 12 detectors.

Figure 2:
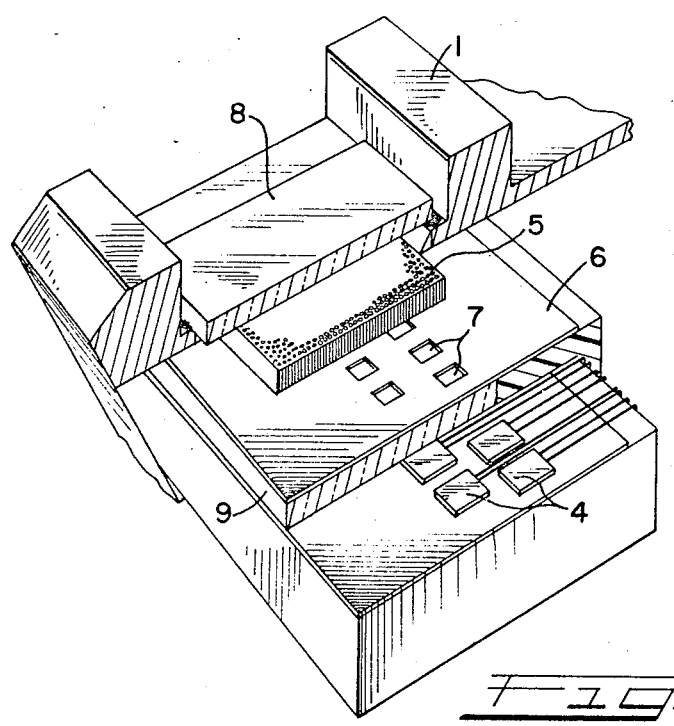
FIG. 2 shows a detailed perspective view of a detector unit using a collimator.

A principal purpose of using fiber optic bundles and causing the elimination of "crosstalk" is to insure greater signal to noise ratio. The use of a fiber optic bundle reduces the area scanned by the detector unit. A better way of effecting resolution is to use a collimator plate. Such a system is shown in FIG. 2. The organization of a typical detector unit using a collimator plate 5 shows the collimator plate overlying the detector cells. If a collimator plate 5 is used the detector unit must be located near the weld seam being examined. However, by using a collimator plate 5, the distance between the detector unit and the weld seam is not as critical because the collimator plate cuts down the aperture angle of the unit very considerably. That is to say, the collimator plate allows radiation to pass through it from objects which lie directly in front of the collimator plate 5. Radiation from objects which lie to one side of the collimator plate does not pass through the collimator plate. Because of this property it is readily apparent that the distance of the collimator plate from the weld seam being examined does not effect to any great extent the sensitivity of the detector unit of the circuit.

A typical metal collimator plate 4 is shown in FIG. 2 in cross section. The metal walls of this collimator plate absorb radiation coming into the plate at an angle. If a collimator has a fixed thickness then the smaller the hole size in the collimator the greater the resolution of the collimator. In the collimator being used in this apparatus holes of 1 mil inches diameter are used and a resolution of about 0.010×0.010 inch is possible at 50 mil distance of the detector unit from the can seam. A variation in resolution limit may be accomplished by varying the size of the detector cell. If the plate is made to have length to diameter ratio of say, 100 to 1 then the degree of resolution effected by the collimator is relatively great. In this way the outline of the defect is scrutinized by the detector unit. The outline is plainly discernible in the infrared radiation passed through the collimator plate to the detector unit. Each detector causes a change in the electric current output depending on the amount of radiant energy that falls upon it. Where the seam 3 is in line with the collimator then only radiation from the seam affects the detectors and stray radiation is excluded from the detectors. The output of the detectors corresponds with the amount of infrared radiation coming from the weld seam.

Another means of reducing the amount of crosstalk between channels is the use of an optic mask 6. This mask is located on the bottom side of a collimator or fiber optic section. The apertures 7 in the mask are about the size of the detector cell 4 and help to heighten the resolution of the system in that they reduce the amount of radiation that enters the detector cell and the mask obstructs radiation which originates in areas outside the desired area of observation of the detector. That is to say that radiation originating outside the detectors desired area for observations is blocked by the mask so that this unwanted radiation has no opportunity to impinge upon the detector cell 4 and thus affect the output of the detector cell. Quartz elements 8, 9 transmit the infrared radiation.

FIG. 3 shows a view of the details of the fiber optic core. This view is shown in part section to facilitate understanding its operation. The fiber core is made of a transparent material 10 having a different index of refraction from the material of the cladding 11. In this way when light enters along the longitudinal axis of the fiber bundle it goes more or less straight through the fiber bundle. However, if it strikes the refractive cladding, it may be totally reflected internally.

The property of the bundle which causes radiant energy to travel parallel to the walls of the interface between the two transparent materials is that radiant energy is totally reflected internally if it strikes the cladding walls with an angle greater than a certain angle called the critical angle. This property of a fiber optic bundle serves to make sure that the great bulk of light passing through the fiber optic bundle is light passing in a direction along the longitudinal axis of the fiber optic being considered.

Some of the light entering the top of a fiber bundle hits the fiber bundle at an angle such that the greater portion of the light passes from one fiber bundle to another thus creating the problem of "crosstalk."

By putting an occasional radiant energy absorptive fiber 12 among the radiant energy transmitting fibers "crosstalk" is minimized. This happens because as "crosstalk" passes from fiber to fiber it impinges on one of the absorptive fibers and is absorbed. The radiant energy passing along the axis of the transmitting fibers is unimpeded. The absorptive fiber may be a single fiber of light absorptive material such as darkened glass.

Another means of insuring parallel light and thus greater resolution of the object being detected is to coat each optic fiber with an extramural light absorptive cladding such as pitch. This is called EMA. The use of extra mural cladding is to eliminate all rays of radiant energy which is passing down the fiber optic strike or impinge against the wall of the core and are refracted from one bundle to another thus causing "crosstalk."

As shown in FIG. 4, a mask 6 is an optically impervious material which stops unwanted radiation whereas that radiation which is to be viewed by the detector cell is allowed to pass through the apertures 7 in the mask. Since the apertures in this mask are fine and the outline of each hole must be sharply defined, a very ductile but optically opaque material is necessary. A material such as gold may be used in this device.

The masks shown in FIGS. 5 and 6 have staggered apertures 7 in FIG. 5 and apertures 13 in a straight line in FIG. 6. Photoelectric cells are located behind each aperture. The use of apertures 13 in a straight line in a mask 14 is preferred because of section across the can seam is scanned at one time. Where the mask apertures are staggered then different cross sections of the can seam are scanned at one time. Further, a defect which lies across the lateral border of an aperture may be imperfectly detected. This is because the successive detector apertures and photoelectric cells which are affected by the defect are affected at different times. The temperature of a defect change with time and thus the signal obtained from the lines of detector cells will be different for the same defect.

Photoelectric cells such as lead-sulfide detector cells are used in this apparatus. The cells of this type are intended for very low energy levels, for example, on the order of a microwatt. he wattage generated by the infrared radiation of our weld seam is of a much higher order and saturation of the lead sulfide detector takes place. One way to avoid this effect is to place a filter between the radiation source and detector cells as shown in FIG. 7. A neutral density filter 15 has uniform attenuation throughout its entire spectrum. Such a filter is preferred in this apparatus and may let through 10–20 percent of the incident radiation. The radiation intensity emanating from a black body or a seam as ours is proportional to the fourth power of the temperature. From this relationship it is apparent that relatively small changes of radiation at higher temperatures bring about considerable changes in the radiation level emanating from black bodies at these temperatures. Since we are operating in the range of 1,500° to 2,400° F. more 1,500°less, the variation of temperature between defective can seams which have not been welded and can seams which are burned through is considerable and at an elevated temperature the consequent variation in radiation intensity is even more considerable. The use of a neutral density filter between the infrared source and the detector unit lessens the intensity of variation of radiant energy to which the detector cell must be responsive.

The effect of use of this filter is to reduce the incident energy to within the operating range of sensitive photoelectric detectors. The limit of resolution of our device is the size of the photoelectric cell used in the device. It is readily apparent that the size of the area controlled depends upon the size of the lead sulfide detector which in the present device is on the order of 0.010 inch square. The end area inspected must be as large or larger than the detector so that irregularities in the can weld are found and converted to electric potential by the circuit which interprets the level of electricity or other energy coming from the detector unit. In summary, the size of the area which may be inspected is controlled by:

The size of the detector cell.

The effectiveness of the collimator.

The distance from the top of the collimator to the detector cell and the distance from the collimator to the can seam.

It is readily appreciated from the discussion above that one of the advantages of collimating the heat from the infrared source is that an instrument of higher resolution is obtained and smaller hot and cold spots along the can seam are detected by our defect detection unit.

The detector unit (FIG. 1 and 8) is located under the can seam 3 thus when welding occurs sparks and metal and other solid material are frequently given off from the can seam. It is essential that the window 8 protecting the detecting unit remains clean. If this window becomes dirty and sensitivity of the detector is varied. That is to say, the emanations coming from the can i.e., infrared radiation of a given intensity on passing through a dirty protective window will show up at the detector to be of lower intensity than would be the case if the window is clean. In any case, if the window 8 becomes dirty the detector unit interprets them as a low heat or poorly welded can and the can rejection system rejects all cans to indicate a malfunction or problem with the detector head or the welding process and no defective cans pass until the situation is rectified. A high pressure jet of air is fed into the detector unit head 1 and jets out of a slot 16 located alongside the detector window. The orifice slot is directed in such a way that the jet of air passes across the surface of the window 8 and exercises a cleaning influence. This jet of air provides a high velocity curtain which sweeps away all the debris from the window. The jet of air is under pressure more or less constant pressure and exercises a cooling influence upon the surface of the window. The airhose 17 shown in FIG. 8 conducts compressed air from a compressor (not shown) to the detector head 1 where it passes through a passageway to the exit slot. This compressed air is then jetted from the slot 16 across the surface of the window 8.

The detector head is of necessity located near to the can seam. The detector head is spaced from the can seam to avoid wear of the detector shoe 18 (FIG. 1) and its associated optical system and to eliminate scratching of the can by the shoe. The spacing is made possible by the use of the collimator. By spacing the detector head from the can seam the need for a mechanical system of springs, levers, etc., to keep the shoe and detector and its system in constant contact with the can seam is eliminated (FIG. 9). When the detector head is spaced from the seam then some heat is radiated from the can seam and impinges upon the detector head. Water cooling (FIG. 10) is used to avoid undue heating of the detector head 1. The water is circulated through the head from a hose connection 19. Water passes through passageways 20 in the head. These passageways are located as near to the detector unit 21 as possible.

The purpose of water cooling the weld monitor detector head is twofold. A first purpose is to keep the fiber optics or optical window at a stable constant temperature below that point of temperature at which the ends of the fiber optics or the optical window might appear as a second radiant source. Such a second radiant source would mask the variations in the can seam temperature. By keeping the infrared transmitting system at a relatively low temperature the detector cells respond to weld seam temperature only. A further purpose or advantage of water cooling is to keep the lead sulfide infrared detector cells at a constant temperature. Lead sulfide detector cells 4 have the characteristic that their resistance varies with the temperature of the cell. The entire effectiveness of the detector unit depends upon the response of the lead sulfide detector cell. By keeping the lead sulfide detector cell at a constant temperature the responsiveness of the cell is kept constant and the uniformity of the results is assured. In short, a temperature reference condition is established which does not change with time or variations in temperatures of a variety of can seams. Electrical conduit 23 houses electrical connecting elements 24 (FIG. 10).

Water cooling as applied to the collimator has the same effect as if applied to the fiber optics.

It is noted that the passageways in the detector unit head have serrated walls 22 in order to insure greater transfer of heat from the detector head to the water flowing therethrough.

While the term photoelectric cell has been used it is understood to include photovoltaic, photoconductive or any other material the properties of which are affected by electromagnetic radiation.

The foregoing is a description of an illustrative embodiment of the invention, and it is applicant's intention in the appended claims to cover all forms which fall within the scope of the invention.

1. An infrared radiation detector system comprising in combination:
  flat optical resolving means having a surface and having parallel passageways for absorbing all infrared radiation except that normal to the surface of said resolving means,
  mask means mounted adjacent said revolving means for obstructing undesired radiation and passing desired radiation, and
  photoelectric cell means mounted adjacent said mask means for generating electric current in response to infrared radiation falling on said cells.

2. An infrared radiation detector system as set forth in claim 1 in which said optical resolving means comprises,
  a collimator plate.

3. An infrared radiation detector system as set forth in claim 2 in which said collimator plate comprises,
  a plate having parallel passageways extending normal to the surface of the plate and through said plate, each said passageway having a length at least 10 times that of its aperture.

4. An infrared radiation detector system as set forth in claim 3 in which said passageways further comprise,
  walls made of an infrared absorptive material.

5. An infrared radiation detector system as set forth in claim 1 in which said mask means and said photoelectric cell means comprise,
  a sheet of opaque material having square apertures located in side-by-side relationship with said opaque material between said apertures across said detector unit and mounted between said optical resolving means and said photoelectric cells, and
  a plurality of square photoelectric cells with each cell opposite an individual aperture.

6. An infrared radiation detector system as set forth in claim 5 in which:
  each of said apertures in said sheet is approximately 0.010 inch square and there are 12 apertures.

7. An infrared radiation detector system as set forth in claim 1 in which said mask means comprises,
  a sheet of opaque material having square apertures located in staggered relationship across said detector unit.

8. An infrared radiation detector system as set forth in claim 1 in which said optical resolving means comprises,
  a bundle of optically transmitting fibers having two ends,
  one end of each of said fibers having its optical axis pointing in the direction of said photoelectric cells,
  the other end of each of said fibers having its optical axis pointing in the direction of the infrared radiation source, and,
  a few darkened fibers spaced from each other in the bundle to provide absorption means to absorb infrared radiation which crosses from one optically transmitting fiber to another.

9. An infrared radiant energy weld inspection device comprising in combination:
  optical resolving means having at least an aperture at one end for allowing passage therethrough of radiant energy from the section of an infrared radiant energy source that is directly in front of the aperture and having passageways extending normal to the surface of said resolving means,
  infrared absorptive means in said optical resolving means for absorbing infrared energy that does not originate from directly in front of said aperture, mask means positioned adjacent said resolving means for obstructing undesired radiation and having apertures for passing desired radiation, photoelectric cell means behind said mask means for receiving infrared radiation and converting it to electric current, and electrical conductor means for conducting said current from said cell means.

10. An infrared radiant energy weld inspection device as set forth in claim 10 in which said passageways comprise, walls made of an infrared absorptive material.

11. An infrared radiant energy weld inspection device as set forth in claim 9 in which said optical resolving means comprises, a bundle of fiber having a first and a second end and in which most fibers are of optically transmitting material and occasional fibers are of optically absorptive material, one end of each of said optically transmitting fibers having its optical axis pointing in the direction of said photoelectric cells, the other end of each of said fibers having its optical axis pointing in the direction of the infrared radiation sources whereby infrared radiation is conducted from one end of said fiber to the other, and occasional ones of said fibers are blackened to provide absorption means to absorb infrared radiation which crosses from one fiber to another.

12. An infrared radiant energy weld inspection device as set forth in claim 9 in which said photoelectric cell means comprises, a series of photoelectric cells each positioned behind an aperture in said mask.

13. A method of detecting weld defects comprising the steps of:

instantaneously heating an unwelded seam between two metal sheets to welding temperature to cause said metal sheets to fuse one to the other whereby the temperature of properly welded sections fuse to a predetermined level and the temperature of defectively welded sections to rise to a level either above or below the predetermined level, moving said seam across a detector head, and allowing radiant energy from sections of said weld seam to fall upon radiant energy sensing means located in said detector head.

14. An infrared radiation detector unit as set forth in claim 7 in which said photoelectric cell means comprises, a plurality of square photoelectric cells each located behind one of said square apertures in said mask whereby infrared radiation passes through each aperture onto one corresponding photoelectric cell.

15. An infrared radiation detector unit as set forth in claim 14 in which said apertures in said sheet and said photocells comprise, apertures of about 0.010 inch square each, photocells of about 0.010 inch square each, and each said photocell is located opposite an individual aperture with its orientation such that all of the collimated infrared radiation passing through each aperture falls on its corresponding photocell.

16. An infrared radiant energy weld inspection device as set forth in claim 9 further comprising:

a neutral density filter mounted between said optical means and said infrared energy source whereby the intensity of said infrared radiant energy reaching said photoelectric cell means is diminished a predetermined amount.

17. An infrared radiant energy weld inspection device as set forth in claim 9 further comprising:

a housing for supporting said resolving means, said mask means and said photoelectric cell means and having passageways in said housing whereby cooling water is circulated through said passageways to keep said resolving means, said mask means and said photoelectric cell at a constant temperature.

* * * * *